United States Patent [19]

West

[11] 3,843,699

[45] Oct. 22, 1974

[54] PREPARATION OF COMPOSITIONS CONTAINING TRANS-ACID COMPLEXES WITH CHROMIUM (III) NITRATE

[75] Inventor: Harry Bowman West, Wilmington, Del.

[73] Assignee: E. I. duPont de Nemours and Company, Wilmington, Del.

[22] Filed: June 4, 1973

[21] Appl. No.: 366,879

Related U.S. Application Data

[63] Continuation-in-part of Ser. No. 212,758, Dec. 27, 1971, abandoned.

[52] U.S. Cl............ 260/438.5 R, 161/192, 161/203, 161/247, 260/438.5 C
[51] Int. Cl. ............................................. C07f 11/00
[58] Field of Search ............... 260/438.5 C, 438.5 R

[56] References Cited
UNITED STATES PATENTS

| | | | |
|---|---|---|---|
| 2,524,803 | 10/1950 | Iler | 260/438.5 C |
| 2,544,666 | 3/1951 | Goebel et al. | 260/438.5 C |
| 2,918,483 | 12/1959 | Varul | 260/438.5 R |
| 3,137,717 | 6/1964 | Peters | 260/438.5 R |

OTHER PUBLICATIONS

Chem. Abstracts, Vol. 64, 1535/e, (1966).
Chem. Abstracts, Vol. 42, 5367d (1948).
Chem. Abstracts, Vol. 48, 9856a, (1954).
Chem. Abstracts, Vol. 44, 8811h, (1950).

*Primary Examiner*—Helen M. S. Sneed

[57] ABSTRACT

Solid, water-soluble compositions consisting essentially of a complex of a trans-acid with chromium (III) nitrate and 0-1.5 moles of a nitrate of ammonium or an alkali metal per gram-atom of chromium are prepared by dispersing a solution in water of a complex in 10-100 volumes of acetone at 0°-50°C. These compositions are excellent coupling agents for glass fiber-polyolefin composites.

6 Claims, No Drawings

PREPARATION OF COMPOSITIONS CONTAINING TRANS-ACID COMPLEXES WITH CHROMIUM (III) NITRATE

CROSS REFERENCE TO RELATED APPLICATION

This is a continuation-in-part of application Ser. No. 212,758, filed Dec. 27, 1971, and assigned to the assignee of the present application and now abandoned.

BACKGROUND OF THE INVENTION

This invention relates to a novel process for the preparation from aqueous solution of solid, watersoluble compositions containing complexes of chromium (III) nitrate with certain trans-acids.

The copending application of Charles C. Cumbo, Ser. No. 212,759, filed concurrently herewith and assigned to the same assignee discloses novel, solid, water-soluble complexes of certain trans-acids with chromium (III) nitrate. These complexes are outstanding coupling agents for various reinforced resin composites, and especially for glass-fiber/polyolefin composites. The process of the Cumbo application requires the use of organic liquids, such as tetrahydrofuran, lower alcohols, chlorinated aliphatic hydrocarbons, aromatic hydrocarbons, and ethers.

There is a need for a process capable of producing useful, water-soluble complexes of trans-acids with chromium (III) nitrate from concentrated, aqueous solutions.

SUMMARY OF THE INVENTION

According to this invention, there is now provided a process for the preparation of compositions consisting essentially of a complex of chromium (III) nitrate with a trans-acid having the following formula (1):

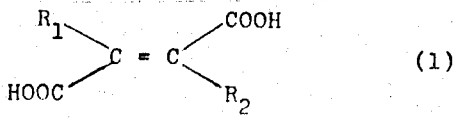

wherein each of $R_1$ and $R_2$ independently is hydrogen, alkyl, phenyl, or the $-CH_2COOH$ group;
  provided that the maximum number of carbon atoms in the trans-acid is 10; the proportion of the trans-acid is 0.1–0.7 mole per gram-atom of chromium; and there are 1–1.5 gram-equivalents of nitrate ions per gram-atom of chromium.

These compositions also contain 0–1.5 moles of a nitrate salt, selected from ammonium, sodium, potassium, and lithium nitrate per gram-atom of chromium.

The process comprises the steps of preparing a complex of trans-acid with chromium (III) nitrate in solution in water, adding the aqueous solution with good agitation at 0–50°C. to 10–100 volumes of acetone, and recovering the resulting solid product from the slurry.

For the purposes of this disclosure, a trans-acid is an acid which has two carboxylic groups in the trans-configuration to each other.

DETAILED DESCRIPTION OF THE INVENTION

The precipitation of a trans-acid complex with chromium (III) nitrate by dispersion of the complex solution in acetone is the critical step of this process. The complex itself may be prepared in several ways, as will be more fully discussed below. Depending on the manner in which the complex itself is prepared, the final composition may or may not contain, in addition, ammonium nitrate or an alkali metal nitrate.

One preferred process for the preparation of the complex comprises adding a base, selected from ammonium, sodium, potassium, and lithium hydroxide, carbonate and bicarbonate, and the desired trans-acid to a solution of chromium (III) nitrate in water, the amount of the base being 1–1.5 gram-equivalents per gram-atom of chromium, and the amount of the trans-acid being 0.1–0.7 mole per gram-atom of chromium; and heating the mixture at a temperature from about 50°C. to reflux for a period of about 10 minutes to 1 hour to substantially drive to completion the formation of a complex of the trans-acid with chromium (III) nitrate. For best efficiency it is preferred to start the reaction with a chromium (III) nitrate solution containing at least 5 weight percent of chromium.

While the order of addition of the reactants is not critical, the reaction is better controlled in an even more preferred two-step process, wherein the chromium nitrate and the base are first contacted and the trans-acid is then added. Typically, the chromium nitrate and the base will be combined in water at room temperature, then heated to reflux for 10–15 minutes or to a lower temperature for a longer period of time, for example, 50°C. for one hour. The trans-acid is then added, and heating is continued until the complex formation is substantially complete.

Complexes having 0.4–0.6 mole of the trans-acid per gram-atom of chromium combine the optimum water solubility and coupling activity. Complexes having 1–1.5 nitrate ions per chromium atom, after correcting for the supplementary nitrate salt, are preferred as being free-flowing granular powders and having satisfactory water solubility. Complexes containing less than one nitrate ion per chromium atom frequency have low solubility in water, although prolonged heating, particularly in the presence of added nitric acid, will result in dissolution. The preferred bases, which after reaction may be present as their nitrates in the compositions made by the process of this invention, are ammonium and sodium hydroxides because they provide the highest bonding strength between the glass fibers and the polyolefin, and are the least expensive sources of base.

Complexes that do not contain any alkali metal or ammonium nitrate can be prepared by at least two different processes. In the first process, chromium (III) nitrate is treated in aqueous solution with an anion exchange resin in hydroxyl form such as alkyl quaternary ammonium compounds until about 1–1.5 equivalents of nitrate anion per gram-atom of chromium are replaced by hydroxyl groups. This partly anion exchanged solution is then heated with appropriate trans-acid until a complex is formed.

In another process, chromium trioxide ($CrO_3$) is contacted with hydrogen peroxide in the presence of 1.5–2 moles of nitric acid per mole of chromium trioxide. The resulting chromium (III) solution is heated with the trans-acid to form the complex.

The complex formation can be followed spectroscopically because the complexes have a blue-green color and, when freshly prepared, have the following characteristic absorption maxima (λ) and molar extinction coefficients (ε).

| λ(mμ) | ε(liters/mole·cm)* |
|---|---|
| $\lambda_1$ 410–415 | $\epsilon_1$ 22–28 |
| $\lambda_2$ 570–575 | $\epsilon_2$ 22–28 |

*based on gram-atoms of chromium.

The complex formation is substantially complete when the molar extinction coefficients are within the above ranges. The coefficients may change in value as the solutions age.

Typical trans-acids suitable in the process of this invention are fumaric, mesaconic, and trans-aconitic acids. Fumaric acid is preferred because it gives coupling agent compositions of highest effectiveness.

Compositions prepared by the process of the present invention are water-soluble and form solutions which contain at room temperature at least 1 weight percent of chromium. This does not mean, however that each complex will readily dissolve at room temperature. In practice, it is preferred to heat a slurry of a complex in water for a few minutes to at least 50°C. to facilitate the dissolution. The complex will remain in solution, even after cooling to room temperature. The preferred products of this invention are water-soluble to the extent of at least 3 percent by weight of chromium.

The apparent difficulty in dissolving these complexes in water at room temperature is due to the fact that the dry product contains significantly less than the theoretical amount of hydration water. Once the material has been fully hydrated at a higher temperature its water-solubility is considerably increased, and it remains in solution. Complexes containing more than 0.7 mole of the trans-acid per gram-atom of chromium are usually not sufficiently soluble to be useful coupling agents. Below 0.1 mole, their coupling effectiveness is reduced.

Although the exact chemical structure of these complexes cannot be readily ascertained, it is believed that at least some chromium atoms are linked together by the trans-acid, as illustrated by the following Formula (2)

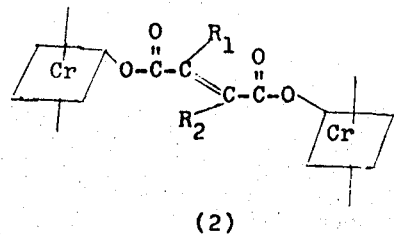

(2)

and some chromium atoms are linked together by "ol" bonds, as shown, for example, in Formulas (3) and (4). The latter chromium atoms are said to be olated.

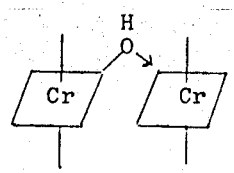

(3)

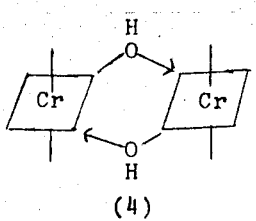

(4)

It is believed that the carboxylic acid-chromium bonds are formed, at least in part, by rupture of the "ol" bonds, as shown below:

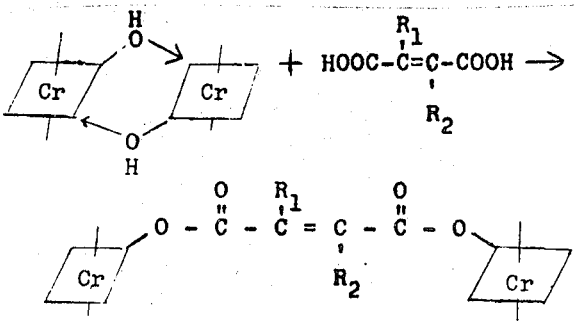

while "ol" bonds can be formed by reaction of chromium (III) nitrate with the base, as follows:

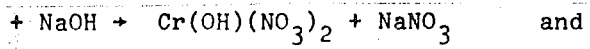

and

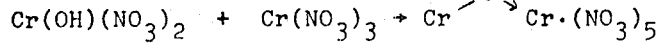

It is to be noted that the nitrate salt of the base is formed in this step. However, the exact mechanism of these reactions is not known with certainty and it is only proposed here as a reasonable speculation. Whether or not olated chromium (III) nitrate is formed first and the "ol" bonds break next is immaterial from the standpoint of the operative features of the process, and the preparation of complex solutions is not considered to be an inventive feature of the present process for the preparation of solid, water-soluble complex compositions.

In the critical step of this process, a solution of the trans-acid complex with chromium (III) nitrate is added to a sufficient volume of acetone to cause the precipitation of a composition consisting essentially of the chromium complex and a nitrate salt in high yield. The minimum practical amount of acetone is about 10 volumes of acetone for each volume of the solution. No advantage is gained by increasing this ratio above about 100 volumes of acetone per volume of the solution, but the most practical volume ratio is about 60–90:1.

While a suitable product can be obtained by adding acetone to the chromium complex solution, it is preferable to add the solution to the acetone. In the latter method, dispersion of the solution is more efficient and nucleation of solid particles is achieved without forming a gummy or oily phase. Although this step can be carried out at any temperature below about 50°C., it is not practical to work below room temperature because of the inconvenience and expense of refrigeration. The temperature range of 25°–50°C. is, therefore, preferred. The product is recovered by any suitable technique, including filtration, centrifugation, and decantation. It is then dried, if desired, at a temperature not over about 50°C.

The preferred products made by the process of this invention are free-flowing, granular powders. When redissolved in water, they give colored solutions, which have the following spectral characteristics:

| λ(mμ) | ε(liters/mole·cm)* |
|---|---|
| $\lambda_1$ 410–415 | $\epsilon_1$ 25–35 |
| $\lambda_2$ 570–575 | $\epsilon_2$ 25–35 |

* based on gram-atoms of chromium.

It is to be noted that the molar extinction coefficients of these products are greater than those of the starting aqueous chromium (III) complex solutions. Thus, it appears that some further reaction takes place during the precipitation step.

This invention is now illustrated by examples of certain preferred embodiments thereof, wherein all parts, proportions, and percentages are by weight unless indicated otherwise.

EXAMPLE 1

Chromium nitrate nonahydrate (46.2 g, 0.116 moles) was dissolved in 38 g of water. While stirring the solution, 10.9 g (0.136 equivalents) of 50 percent aqueous sodium hydroxide were added, keeping the temperature below 40°C by the use of external cooling. Some solids were observed in the solution at this point. The temperature was then raised to reflux (106°C) and held there for 15 minutes. The precipitate dissolved and the solution turned green. Fumaric acid (6.7 g, 0.058 moles) was added and refluxing was continued for another 15 minutes. The solution was cooled to 25°C and filtered to remove a small amount, less than 0.1 g, of insoluble matter. The resulting solution was blue-green and was found by analysis to contain 5.9 percent chromium. The pH of this solution was 0.06.

Thirty grams of the above fumaratochromium nitrate solution was poured slowly into 1892 ml of acetone while stirring vigorously. Stirring was continued five minutes after addition was finished. The precipitate which formed was separated by filtration. After washing with three 100 ml portions of acetone and drying under nitrogen at room temperature, 10.1 g of solid product was recovered.

A portion of the product was dissolved in hot water, analyzed, and found to contain 15.5 percent chromium, 1.1 moles of sodium nitrate per gram-atom of chromium, and 2.2 gram-equivalents of total nitrate anion per gram-atom of chromium, thus showing that the chromium complex has 1.1 nitrate ions per chromium atoms.

A sample of this solution was diluted to 0.046 molar chromium and the light absorption spectrum determined on a Cary Model 11 Spectrophotometer. The resulting spectrum had absorption maxima at 415 and 575 m$\mu$ with molar extinction coefficients of 27.9 and 29.3, respectively. The solid product contained 0.5 mole of fumaric acid per gram atom of chromium.

A 0.3 g sample of the dry product was heated in 1.1 g of water to 70°C. where all the product dissolved. On cooling to room temperature, all the product remained in solution. This solution contained 3 percent by weight chromium.

The above fumaratochromium complex was then used as a coupling agent for the fabrication of two polyethylene-E-glass fiber fabric laminates. The woven E-glass fabric was a commercial grade Style 181, heat cleaned, Finish 112, available from J. P. Stevens & Co., Inc., 1460 Broadway, New York, N.Y. 10018. The polyethylene was a resin in the form of pellets commercially available as Alathon 7050 grade from E. I. du Pont de Nemours and Company.

Seven grams of the complex were added to 993 g of water to give a dilute coupling agent solution having a chromium concentration of 0.1 percent. The pH of this solution was adjusted upward to 3.0 by the addition of one molar sodium bicarbonate solution.

Four 38 inch long, 6 inch wide strips of glass fabric were cut from a roll in the fill direction and soaked in the coupling agent solution for about 5 minutes. The strips were next passed through a wringer with roller tension adjusted to give a wet pickup of approximately 50 percent. The strips were then dried in a circulating-air oven for 10 min at 125°C and cut into 6 inch × 6 inch panels. The 24 resulting panels were frayed approximately ¼ inch on each edge, by removing threads parallel to the edge.

The polyethylene pellets were mixed with an equal weight of dry ice and milled through a Wiley mill, then dried in an air oven at 100°C for four hours. A fine, dry polyethylene powder was thus obtained.

Each of the two laminates was then made and tested as follows:

Thirty-nine grams of the polyethylene (PE) powder were divided into thirteen 3 g fractions. The first 3 g fraction was spread evenly at the bottom of the cavity of a 6 inches × 6 inches steel mold. A 6 inches × 6 inches treated glass fabric panel was placed flat on top of the PE powder layer, and a second 3 g fraction of PE powder was in turn spread evenly on top of the glass fabric panel. The operation was repeated until a PE-glass fabric sandwich made up twelve layers of glass fabric panels alternating with layers of PE powder was assembled inside the steel mold. The last 3 g fraction of PE powder was then spread evenly on the top glass fabric panel.

The steel mold thus loaded was placed in a heated press and firm pressure, enough to hold the multilayer sandwich in position, was applied. The press was then heated to 175°C, and 830 psi pressure was applied. The material was held at 830 psi and 175°C for 2 minutes. At the end of this period, the press was allowed to cool to room temperature. The pressure was then released and the mold was unloaded.

A 6 inches × 6 inches × ⅛ inch dense, rigid, light green, translucent laminate was obtained in this manner.

The laminate was clamped onto the reciprocating table of a precision-type, hydraulic-feed, horizontal spindle surface grinder and sliced into test bars, 6 inches × ½ inch × ⅛ inch using a 5 inches diameter resin-bonded diamond cutting wheel. The flexural strength was measured using a modified form of Federal Specification L-P-406b, Method 1031, 27 Sepetember, 1951. Five bars were tested as cut from the laminate, and four bars were tested after being submerged in boiling water for two hours. The average values obtained are referred to as "dry" and "wet" flexural strength (modulus of rupture), respectively. The two laminates had average dry strengths of 48,200 and 49,000 psi, respectively, and average wet strengths of 45,600 and 45,900 psi, respectively. This compares to dry and wet strengths of 15,000 and 8,000 psi, respectively, for a laminate made without the use of a coupling agent.

EXAMPLE 2

Example 1 is repeated except that 9.3 g (0.116 equivalents) of 50 percent aqueous sodium hydroxide and 4.1 g (0.035 moles) of fumaric acid where used. A granular, water-soluble product is obtained which has 0.3 moles fumaric acid per gram-atom of chromium (III).

EXAMPLE 3

Example 1 is repeated except that 8.4 g (0.139 equivalents) of ammonium hydroxide containing 28 percent ammonia is used instead of the sodium hydroxide. A granular, water-soluble product is obtained which has 0.5 moles fumaric acid per gram-atom of chromium (III).

EXAMPLE 4

Example 1 is repeated except that 8.2 g (0.07 moles) of fumaric acid are used. A granular, water-soluble product is obtained which has 0.6 moles of fumaric acid per gram-atom of chromium (III).

EXAMPLE 5

Ten g (0.1 mole) of chromium trioxide is dissolved in 22 g of water and this solution is added to 18 g of 70 percent nitric acid (0.2 mole). While this solution is being stirred vigorously, 30 g of a solution of 20 percent hydrogen peroxide (0.18 mole) is added dropwise while keeping the temperature below 30°C. The reaction mixture is then heated to boiling and refluxed for 15 minutes. Fumaric acid (5.8 g, 0.05 mole) is then added, and reflux is continued for an additional 15 minutes before cooling the product to room temperature.

The resulting fumaratochromium nitrate solution contains about six percent chromium. A solid fumaratochromium nitrate complex is precipitated by adding the solution to acetone as described in Example 1. The solid product contains 0.5 mole of fumaric acid per gram equivalent of chromium (III) and contains no alkali metal nitrate salt. It can be dissolved in water to give a solution containing 1 percent chromium by weight.

I claim:

1. A process for making a solid, water-soluble composition consisting essentially of a complex of chromium (III) nitrate with a trans-acid having the formula

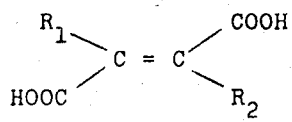

wherein each of $R_1$ and $R_2$ independently is hydrogen, alkyl, phenyl, or the $-CH_2 \cdot COOH$ group;

provided that the maximum number of carbon atoms in the trans-acids is 10; the proportion of the trans-acid is 0.1–0.7 mole per gram-atom of chromium; and there are 1–1.5 gram-equivalents of nitrate ion per gram-atom of chromium;

said composition also containing 0–1.5 moles of a nitrate selected from the group consisting of ammonium, sodium, potassium, and lithium nitrates per gram-atom of chromium;

said process comprising the sequential steps of (a) reacting a solution of chromium (III) nitrate in water with 1–1.5 gram equivalents of at least one base selected from the group consisting of the hydroxides, carbonates and bicarbonates of ammonium, sodium, potassium and lithium, and 0.1–0.7 moles of said trans-acid each per gram-atom of chromium to produce a water solution of a complex, (b) adding a solution in water of said complex with good agitation at 0°–50°C. to acetone, the volume ratio of acetone to the solution being in the range of 10–100:1, and (c) recovering the resulting solid product from the slurry.

2. The process of claim 1 wherein the trans-acid is selected from the group consisting of fumaric, mesaconic, and trans-aconitic acids.

3. The process of claim 1 wherein the temperature is about 25°–50°C., and the volume ratio of acetone to the solution is 60–90:1.

4. The process of claim 1 wherein the trans-acid is fumaric acid.

5. The process of claim 1 wherein there is 0.4–0.6 mole of the trans-acid per gram-atom of chromium.

6. The process of claim 5 wherein the trans-acid is fumaric acid.

* * * * *